US008078004B2

(12) United States Patent
Kang et al.

(10) Patent No.: US 8,078,004 B2
(45) Date of Patent: Dec. 13, 2011

(54) GEOMETRIC REGISTRATION OF IMAGES BY SIMILARITY TRANSFORMATION USING TWO REFERENCE POINTS

(75) Inventors: Yong Q. Kang, Elkton, MD (US);
Young-Heon Jo, Camden, DE (US);
Xiao-Hai Yan, Newark, DE (US)

(73) Assignee: University of Delaware, Newark, DE (US)

( * ) Notice: Subject to any disclaimer, the term of this patent is extended or adjusted under 35 U.S.C. 154(b) by 1044 days.

(21) Appl. No.: 11/935,012

(22) Filed: Nov. 5, 2007

(65) Prior Publication Data
US 2008/0144972 A1 Jun. 19, 2008

Related U.S. Application Data

(60) Provisional application No. 60/858,254, filed on Nov. 9, 2006.

(51) Int. Cl.
*G06K 9/36* (2006.01)
(52) U.S. Cl. ...................................................... 382/276
(58) Field of Classification Search .................. 226/2, 3, 226/27, 55; 399/372, 394, 395; 348/263, 348/580, 745; 455/435.1; 382/151, 276, 382/201, 293, 294, 295, 296, 298; 700/57, 700/124, 251; 347/116; 356/401; 101/481; 704/203, 204, 269; 345/427, 648; 708/5, 708/200, 208, 209, 442, 520, 523, 607, 809; 702/95; 235/410
See application file for complete search history.

(56) References Cited

U.S. PATENT DOCUMENTS

| 4,752,828 | A | * | 6/1988 | Chapuis et al. | 348/580 |
|---|---|---|---|---|---|
| 5,970,173 | A | * | 10/1999 | Lee et al. | 382/236 |
| 6,571,024 | B1 | * | 5/2003 | Sawhney et al. | 382/294 |
| 6,714,679 | B1 | * | 3/2004 | Scola et al. | 382/199 |
| 7,496,242 | B2 | * | 2/2009 | Hunt | 382/293 |
| 7,715,654 | B2 | * | 5/2010 | Chefd'hotel et al. | 382/294 |
| 2002/0141626 | A1 | * | 10/2002 | Caspi | 382/131 |
| 2003/0098872 | A1 | * | 5/2003 | Georgiev | 345/647 |
| 2005/0031197 | A1 | * | 2/2005 | Knopp | 382/154 |
| 2006/0041384 | A1 | * | 2/2006 | Kermani et al. | 702/19 |
| 2006/0104484 | A1 | * | 5/2006 | Bolle et al. | 382/115 |
| 2008/0052638 | A1 | * | 2/2008 | Frank et al. | 715/808 |

* cited by examiner

*Primary Examiner* — Gregory F Cunningham
(74) *Attorney, Agent, or Firm* — RatnerPrestia (57) ABSTRACT

A method for registering a first image to a second image using a similarity transformation. The each image includes a plurality of pixels. The first image pixels are mapped to a set of first image coordinates and the second image pixels are mapped to a set of second image coordinates. The first image coordinates of two reference points in the first image are determined. The second image coordinates of these reference points in the second image are determined. A Cartesian translation of the set of second image coordinates is performed such that the second image coordinates of the first reference point match its first image coordinates. A similarity transformation of the translated set of second image coordinates is performed. This transformation scales and rotates the second image coordinates about the first reference point such that the second image coordinates of the second reference point match its first image coordinates.

17 Claims, 6 Drawing Sheets

GEOMETRIC REGISTRATION OF IMAGES BY SIMILARITY TRANSFORMATION USING TWO REFERENCE POINTS

GOVERNMENT FUNDING

The U.S. Government has a paid-up license in the present invention and the right in limited circumstances to require the patent owner to license others on reasonable terms as provided for by contract as awarded by National Aeronautics and Space Administration under funding numbers NASA Space Grant (NNG05G092H) and NASA (NAG5-11773), and by the office of Naval Research, under funding number ONR (N00014-03-1-0337).

FIELD OF THE INVENTION

The present invention concerns a method of registering images using reference points. In particular, this method is directed to improving registration of images that are partially occluded, such as satellite images of predominately oceanic regions.

BACKGROUND OF THE INVENTION

In the case of images with large geometric distortions, an orthorectification method may be necessary to reduce the distortion due to the relief or the viewing angle of the images. For a first order polynomial image registration model, a minimum of three reference points are required to calculate the model. For satellite imagery these reference point are known as ground control points (GCPs). In practice, it is usually better to use more than three reference points. However, it may not always be practical to obtain more than three reference points, for example, registration of satellite images of coastal and oceanic regions.

Present geometric registration methods use an affine transformation that requires more than three reference points. To determine the correct geometric registration of high spatial resolution images measured by multi-satellite sensors over the ocean, it is often desirable to use only images that include coastal regions. Still, even these methods may not be applicable for situations where there are few GCPs available, such as in oceanographic studies using satellite multi-sensor measurements, which often include significant cloud contamination. The difficulty of registering images is increased by the cloud contamination, as the presence of cloud cover that may occlude some of the GCPs in one or both of the images. Accordingly, it is desirable for improved registration methods aimed at studying images of oceanic regions, as well as land regions.

The present invention addresses this need among others.

SUMMARY OF THE INVENTION

An exemplary embodiment of the present invention is a method for registering a first image to a second image using a similarity transformation. The each image includes a plurality of pixels. The first image pixels are mapped to a set of first image coordinates and the second image pixels are mapped to a set of second image coordinates. The first image coordinates of two reference points in the first image are determined. The second image coordinates of these reference points in the second image are determined. A Cartesian translation of the set of second image coordinates is performed such that the second image coordinates of the first reference point match its first image coordinates. A similarity transformation of the translated set of second image coordinates is performed. This transformation scales and rotates the second image coordinates about the first reference point such that the second image coordinates of the second reference point match its first image coordinates.

Another exemplary embodiment of the present invention is a method for registering a first image to a second image using a similarity transformation. The each image includes a plurality of pixels. The first image pixels are mapped to a set of first image coordinates and the second image pixels are mapped to a set of second image coordinates. A first plurality of potential reference points are determined in the first image and a second plurality of potential reference points are determined in the second image. A set of reference points common to the two pluralities of potential reference points is identified. The first image coordinates and the second image coordinates of each reference point in the set of identified common reference points is determined. A Cartesian translation of the set of second image coordinates is performed such that the second image coordinates of the first reference point match its first image coordinates. If the set of reference points includes exactly two reference points, a similarity transformation of the translated set of second image coordinates is performed to scale the second image coordinates and rotate the second image coordinates about the first reference point such that the second image coordinates of a second reference point of the set of reference points match its first image coordinates. If the set of reference points includes more than two reference points, an affine transformation of the translated set of second image coordinates is performed to register the second image coordinates of the set of reference points to the first image coordinates of the set of reference points.

A further exemplary embodiment of the present invention is a computer readable medium adapted to instruct a general purpose computer to register a first image to a second image using a similarity transformation. The each image includes a plurality of pixels. The first image pixels are mapped to a set of first image coordinates and the second image pixels are mapped to a set of second image coordinates. The first image coordinates of two reference points in the first image are determined. The second image coordinates of these reference points in the second image are determined. A Cartesian translation of the set of second image coordinates is performed such that the second image coordinates of the first reference point match its first image coordinates. A similarity transformation of the translated set of second image coordinates is performed. This transformation scales and rotates the second image coordinates about the first reference point such that the second image coordinates of the second reference point match its first image coordinates.

BRIEF DESCRIPTION OF THE DRAWINGS

The invention is best understood from the following detailed description when read in connection with the accompanying drawings. Included in the drawing are the following figures.

DETAILED DESCRIPTION OF THE INVENTION

Exemplary embodiments of the present invention include methods of registering images with only two common reference points using similarity transformations. These exemplary registration methods may also include the use of more accurate registration algorithms when the images have more than two common reference points. These exemplary methods may enhance present geometric registration processes and may also assist in a wide range of applications in image analysis. The images used may include satellite or other high altitude images of a planetary surface.

Exemplary embodiments of the present invention may be used to obtain a geometric registration using only two reference points. These exemplary methods include processes of translating, scaling and rotating at least one of the images to match a particular size and position. Present technology for the geometric registration, which is also known as georeferencing, georegistration, georectification, and/or geocorrection in the geographic and planetary sciences, requires more than three reference points and is typically accomplished using an affine transformation. One advantage of exemplary embodiments of the present invention over these methods is that exemplary embodiments of the present invention may be applicable to wide ranges of imagery, e.g. satellite images of offshore regions, which have few potential reference points, making it difficult to use affine transformation techniques. However, exemplary embodiments of the present invention may be applicable to these kinds of areas as they require only two common references.

Figure 1:
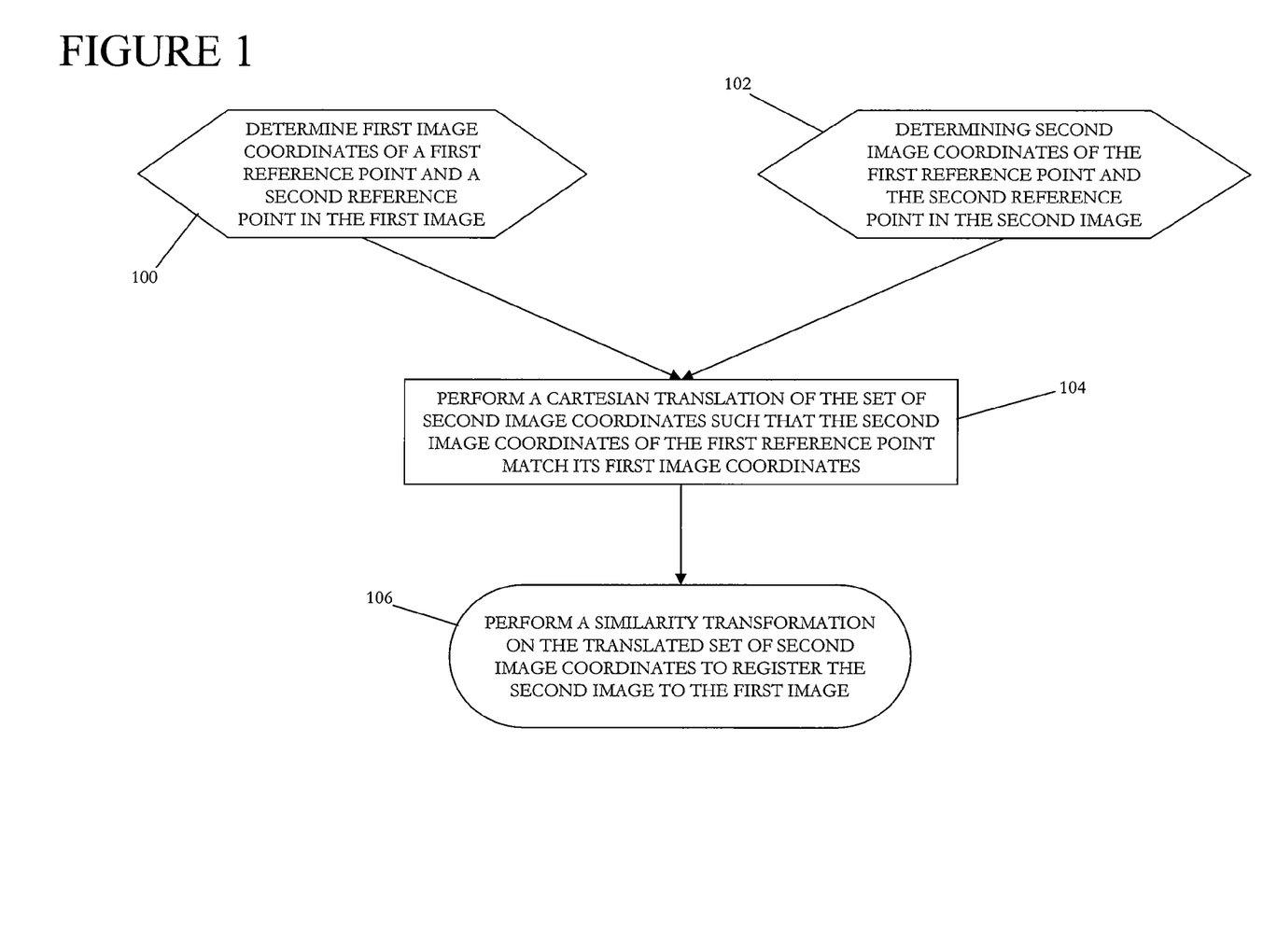
FIG. 1 is a flow chart illustrating an exemplary method of register two images using two reference points according to the present invention.

FIG. 1 illustrates an exemplary method for registering one image to another image using a similarity transformation. The images each include a plurality of pixels. The pixels of each image may be mapped to a set of image specific coordinates. The process of registration involves transforming at least one of these sets of image specific coordinates so that the pixels may be mapped to a common set of coordinates. In the descriptions of the exemplary methods of the present invention, registration is described in terms of transforming one set of image specific coordinates to correspond to the other set image specific coordinates. One skilled in the art will understand that this approach has been adopted merely for simplicity of illustration and is not intended to be limiting.

The images may illustrate different, overlapping portions of a scene. In this situation, registration of the images may allow a mosaic of the scene to be formed. Alternatively, the images may represent data from different sensors, for example visible and infrared sensors, that illustrate approximately the same scene. Proper registration of such images may allow comparison of information about objects in the scene detected by the different sensors.

One skilled in the art will understand that exemplary methods of the present invention may be used sequentially to register many images. It is also contemplated that a combination of overlapping images by the same of similar sensors and images of approximately the same portion of the scene taking with different sensor types may all be registered using exemplary embodiments of the present invention.

First image coordinates for two reference points, a first reference point and a second reference point, are determined in the first image, step 100. Second image coordinates of the first and second reference points in the second image are also determined, step 102. It is noted that each reference point may correspond to one or more pixels in the images. The origin of the set of first image coordinates may be set to one of the corners of the first image, the center of the first image, or another predetermined location in the first image. Alternatively, the origin of the first image coordinates may be set to the location of the first reference point in the first image. In this case, initial first image coordinates of the first reference point in the first image are determined. Then a Cartesian translation of the set of first image coordinates is performed such that the first image coordinates of the first reference point are the origin, i.e. (0, 0). The first image coordinates of the second reference point in the firstimage are then determined using the translated set of first image coordinates.

Figure 2:
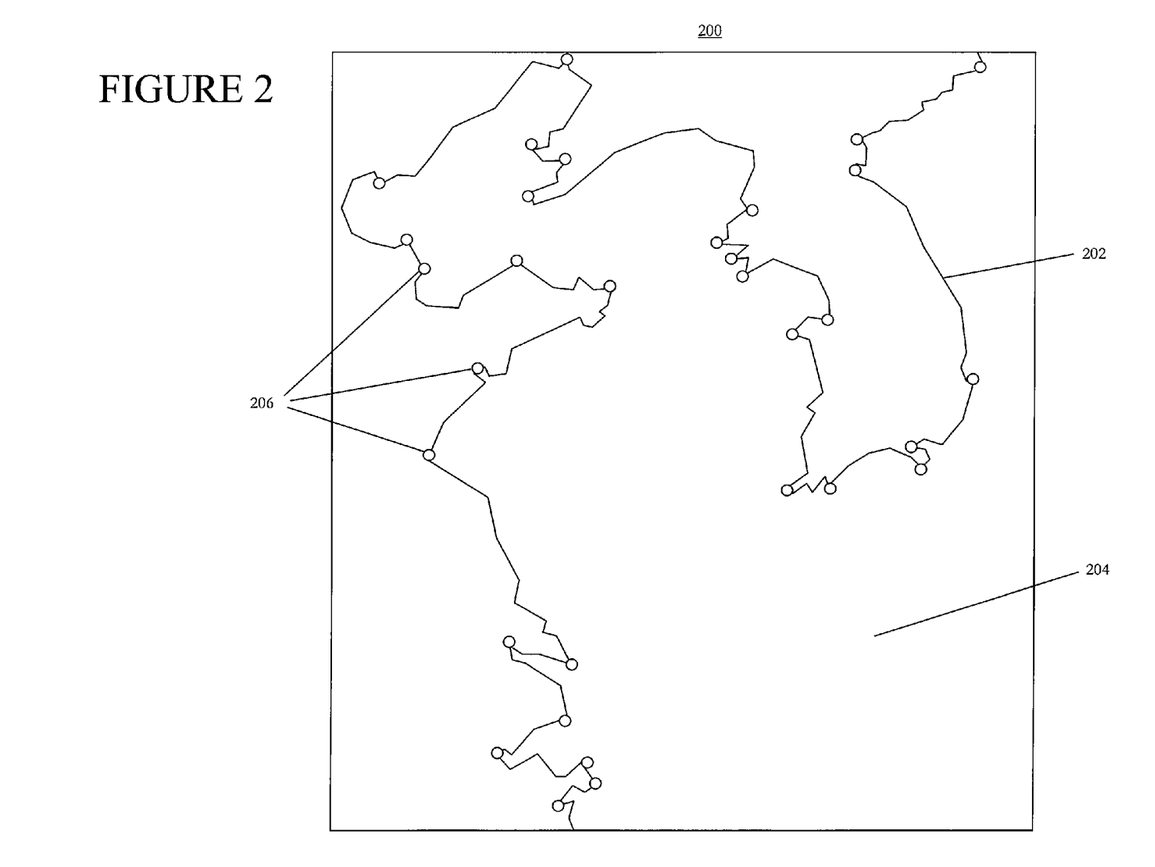
FIG. 2 is a simplified map illustrating an exemplary coastal region with a number of ground control points according to the present invention.

One example of imagery that may be used with exemplary methods of the present invention high altitude images of a planet surface. FIGS. 2, 3A, 3B, 4A, and 4B illustrate the use of the exemplary method of FIG. 1 on simulated high altitude satellite images of the Korean peninsula and adjacent seas. FIG. 2 shows simplified map 200 of these coastal regions. The map includes coastline 202, open water 204 and ground control points (GCPs) 206. These GCPs represent easily identifiable features of the coastline that may be used as reference points for registering images. Actual imagery may include significantly more GCPs than shown in simplified map 200; however, the reduced number of GCPs in FIGS. 2, 3A, 3B, 4A, and 4B is used in these figures to help illustrate the usefulness of exemplary methods of the present invention and to simplify the drawings. This use of a reduced number of GCPs, i.e. potential reference points, is not intended to be limiting.

Figures 3A, 3B:
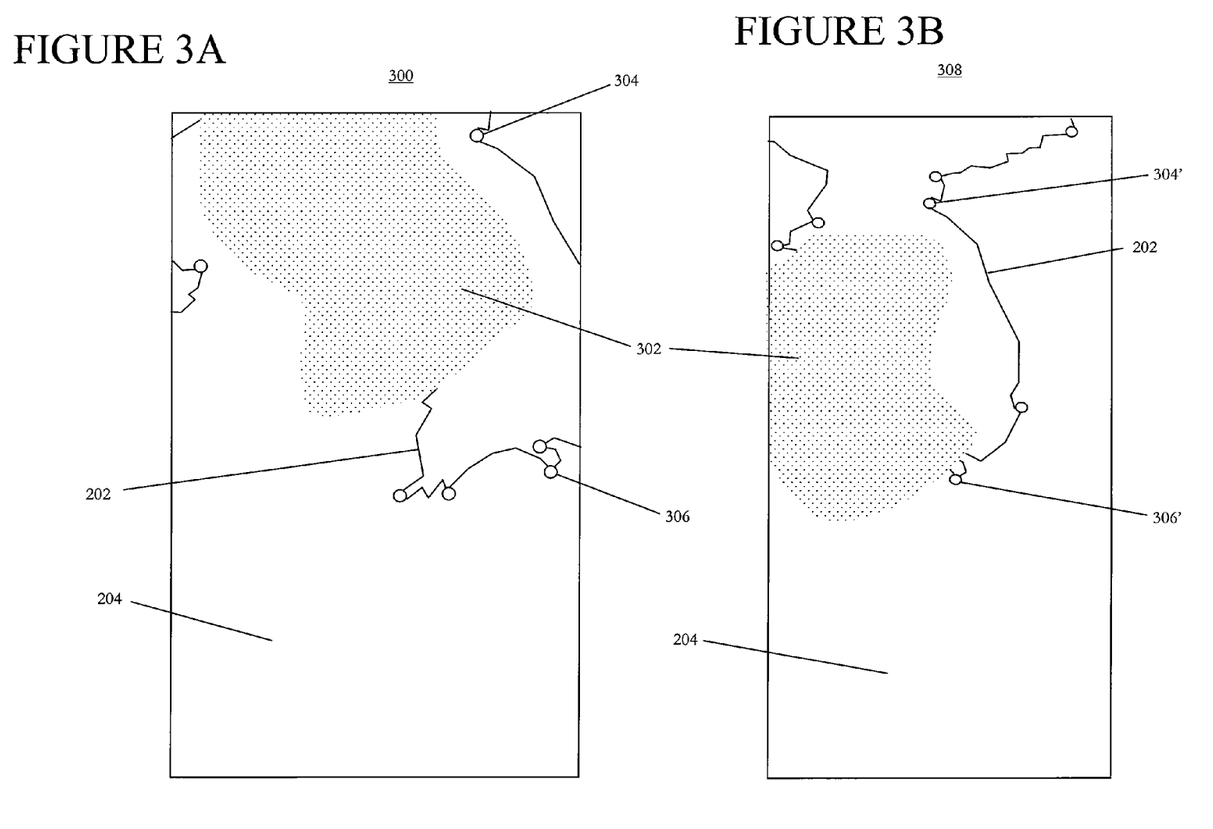
FIGS. 3A and 3B illustrate exemplary simulated images of portions of the coastal region illustrated in FIG. 2.

The reference points in the two images may be determined by identifying two easily recognizable features that are visible in both the first image and the second image. FIG. 3A illustrates first simulated image 300 of a portion of the scene illustrated in simplified map 200. FIG. 3B illustrates second simulated image 308 of another, overlapping, portion of the scene illustrated in simplified map 200. Both of these images include some open water regions 204, sections of coastline 202, and regions obscured by cloud cover 302, as well as several GCPs (shown as open circles). Two of these GCPs, GCP 304/304' and GCP 306/306', are visible in both first simulated image 300 and second simulated image 308. These two GCPs may desirably be selected as the first reference point, GCP 304/304', and the second reference point, GCP 306/306'.

Figure 4A:
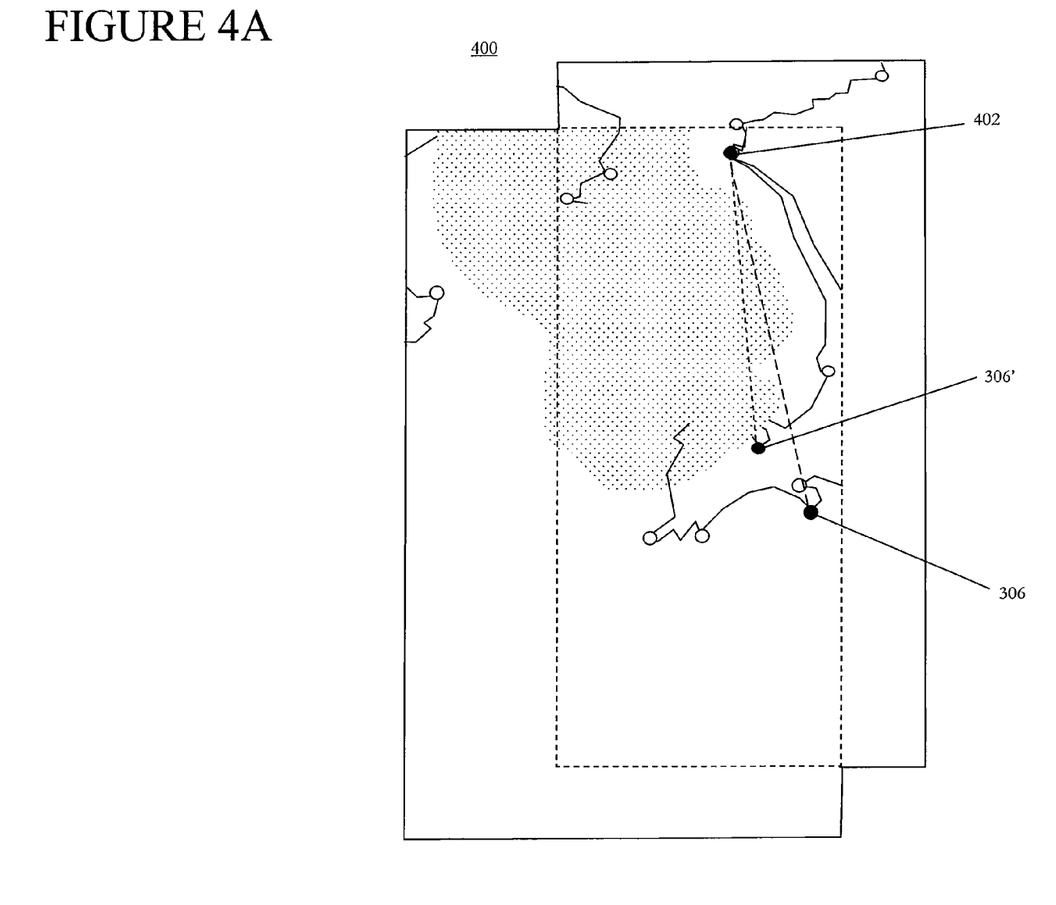
FIG. 4A illustrates the exemplary simulated images of FIGS. 3A and 3B overlaid during the exemplary registration method of FIG. 1.

Once the two reference point are selected and the coordinates in the set of first image coordinates and the set of second image coordinates are determined, a Cartesian translation of the set of second image coordinates is performed such that the second image coordinates of the first reference point match the first image coordinates of the first reference point, step 104 (FIG. 1). FIG. 4A illustrates this step graphically. In overlay image 400, second simulated image 308 has been translated such that first simulated image 300 and second simulated image 308 are overlaid and first GCP 304 from first simulated image 300 and first GCP 304' from second simulated image 308 are coincident, combined first GCP 402. The two dashed lines connecting combined first GCP 402 to second GCPs 306 and 306' illustrate differences in rotation and scale between simulated image 300 and 308, respectively, that are compensated for to complete registration of these images.

A similarity transformation of the translated set of second image coordinates is performed to scale the second image coordinates and rotate the second image coordinates about the first reference point, step 106 (FIG. 1), such that the second image coordinates of the second reference point match the first image coordinates of the second reference point.

The first image coordinates of the first reference point and the second reference point may be written $(x_1, y_1)$ and $(x_2, y_2)$, respectively. The second image coordinates of the first reference point and the second reference point may be written $(x_1', y_1')$ and $(x_2', y_2')$, respectively. A similarity transformation may be used to determined scale, A, and rotational angle, $\theta$, with respect to the first image coordinates to transform the second image coordinates to match the coordinates of the reference points, i.e.

$$(x_1, y_1) \rightarrow (x_1', y_1') \text{ and } (x_2, y_2) \rightarrow (x_2', y_2') \quad (1)$$

Using a rotation matrix representation with a scale, A, and a rotational angle, $\theta$, the relation ship of these two reference points may be written:

$$x_1' = A \cos\theta x_1 + A \sin\theta y_1 \text{ and } y_1' = -A \sin\theta x_1 + A \cos\theta y_1$$

$$x_2' = A \cos\theta x_2 + A \sin\theta y_2 \text{ and } y_2' = -A \sin\theta x_2 + A \cos\theta y_2 \quad (2)$$

These equations give the relation between the coordinates (x2,y2) of a point relative to the (x2,y2) axes and the coordinates (x2',y2') of the same point relative to rotated axes (x2', y2').

Given that the first image coordinates and the translated second image coordinates of both reference points have been determined in steps 100 and 104, the scale, A, and the rotational angle, $\theta$, may be computed from Equation (2). First, to simplify these equations, set $\alpha = A \cos\theta$ and $\beta = A \sin\theta$, or:

$$A = (\alpha^2 + \beta^2)^{1/2} \text{ and } \theta = \tan^{-1}(\beta/\alpha) \quad (3)$$

Using this substitution, Equation (2) may be rewritten in a linear form, i.e.:

$$x_1' = \alpha x_1 + \beta y_1 \text{ and } y_1' = -\beta x_1 + \alpha y_1$$

$$x_2' = \alpha x_2 + \beta y_2 \text{ and } y_2' = -\beta x_2 + \alpha y_2 \quad (4)$$

It is noted that there are two unknown parameters, $\alpha$ and $\beta$, but four equations. Thus, $\alpha$ and $\beta$ are over constrained. However a least square method (LSM) may be used to solve the system of linear equations. The error, E, may be written by:

$$E = (\alpha x_1 + \beta y_1 - x_1')^2 + (-\beta x_1 + \alpha y_1 - y_1')^2 + (\alpha x_2 + \beta y_2 - x_2')^2 + (-\beta x_2 + \alpha y_2 - y_2')^2 \quad (5)$$

To determine minimum error to obtain $\alpha$ and $\beta$, i.e. the best fit, two partial differential equations are satisfied, i.e., $$\partial E/\partial \alpha = 0 \text{ and } \partial E/\partial \beta = 0 \quad (6)$$

and $\alpha$ and $\beta$ are determined to be:

$$\alpha = (x_1 x_1' + y_1 y_1' + x_2 x_2' + y_2 y_2')/(x_1^2 + y_1^2 + x_2^2 + y_2^2)$$

$$\beta = (-x_1 y_1' + y_1 x_1' - x_2 y_2' + y_2 x_2')/(x_1^2 + y_1^2 + x_2^2 + y_2^2) \quad (7)$$

These values of $\alpha$ and $\beta$ may be plugged into Equation (3) to obtain A and $\theta$.

Figure 4B:
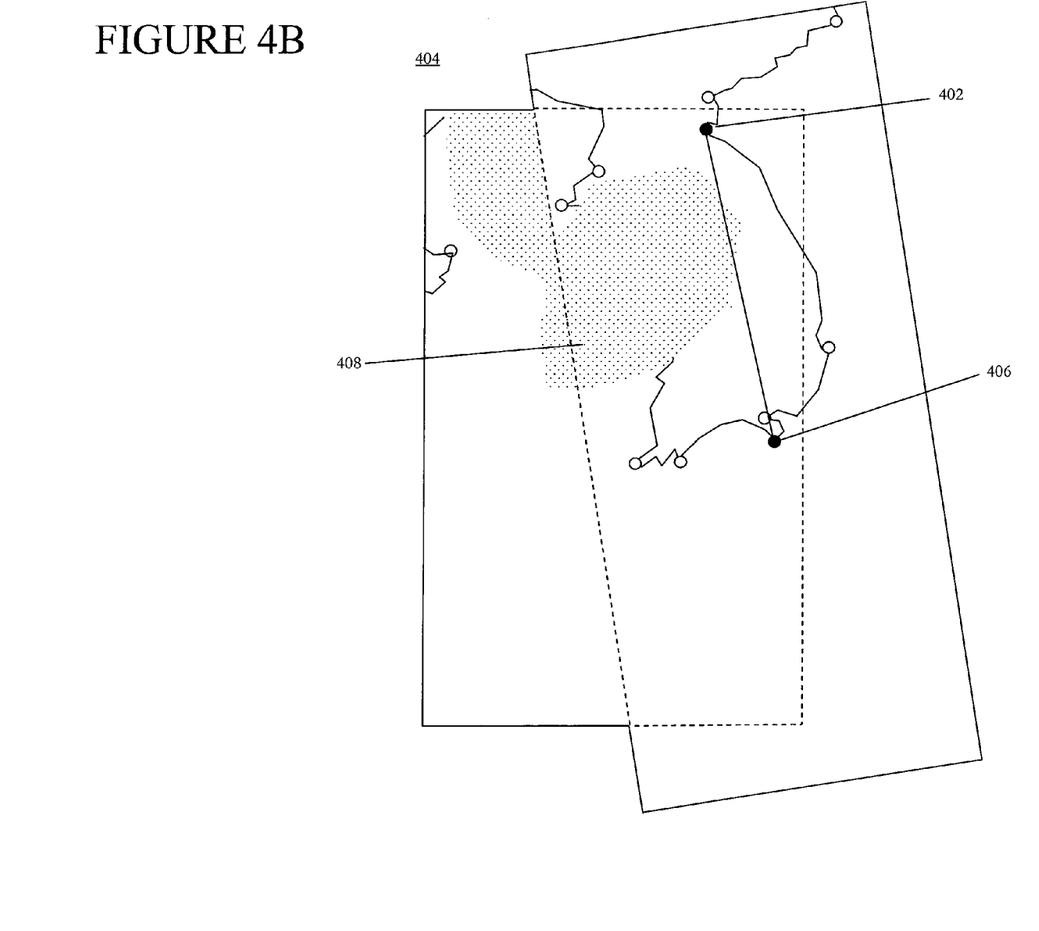
FIG. 4B illustrates the exemplary simulated images of FIGS. 3A and 3B registered by the exemplary method of FIG. 1.

Combined image 404 of FIG. 4B illustrates the resulting scaling and rotation of simulated second image 308. In this image, second GCPs 306 and 306' are coincident at combined second GCP 406. Combined image 404 demonstrates how the exemplary image registration method of FIG. 1 may be used to form a mosaic from two or more smaller initial images. Reduced cloud cover 408 remains only in those portions of combined image 404 that were not visible in either first simulated image 300 or second simulated image 308. Thus, combined image 404 is less affected by the cloud contamination than either first simulated image 300 or second simulated image 308.

It is noted that, in the example use demonstrated in FIGS. 2, 3A, 3B, 4A, and 4B, two simulated images of relatively small portions of the total scene were registered to each other; however, it is contemplated that exemplary embodiments of the present invention may also be used to register a relatively small image to a reference image that includes a relatively large number of predetermined features to use as potential reference points. For example, first simulated image 300 could be registered to simplified map 200. In this case, first simulated image 300 could be scanned to identify any of GCPs 206 to use as reference points.

Figure 5:
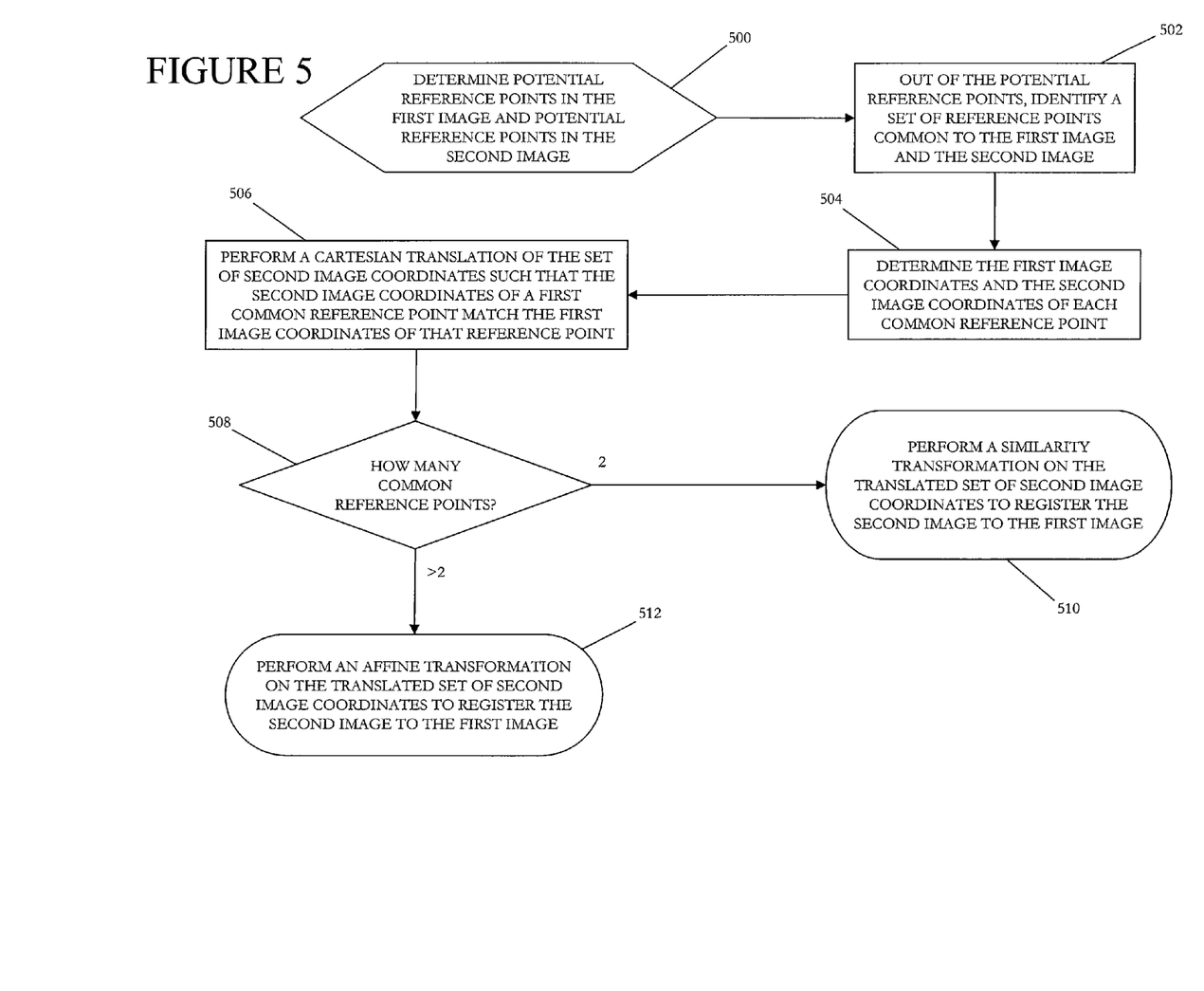
FIG. 5 is a flow chart illustrating an exemplary method of register two images according to the present invention.

FIG. 5 illustrates another exemplary image registration method according to the present invention. In this exemplary method, the first image includes a first plurality of pixels mapped to a set of first image coordinates and the second image includes a second plurality of pixels mapped to a set of second image coordinates. A first plurality of potential reference points is determined in the first image and a second plurality of potential reference points is determined in the second image, step 500. Each of the images may include imagery of a portion of a scene that includes a set of preselected features. Determining the pluralities of potential reference points may then involve identifying subsets of these preselected features of the scene that are visible in the each image and determining depictions of these subsets of features to be the potential reference points.

Once the pluralities of potential reference points in each image are determined, a set of reference points common to both pluralities of potential reference points is identified, step 502. This set of reference points may desirably include exactly two, three, or four elements. If more than four common reference points exist, it may be desirable to only select four to avoid having to perform additional calculations; however, in some cases it may be desirable to select additional reference points due to potential distortions that may reduce the accuracy of the image registration.

The first image coordinates and the second image coordinates of each reference point in the set of reference points identified in step 502 are determined, step 504. One of the reference points is selected to be a first reference point and a Cartesian translation of the set of second image coordinates is performed such that the second image coordinates of this first reference point match its first image coordinates, step 506.

It is then determined how many common reference points are in the set of reference points, step 508. If there are exactly two reference points in the set of reference points, a similarity transformation of the translated set of second image coordinates is performed, step 510, to register the second image coordinates of the set of reference points to the first image coordinates of the set of reference points, as described above with reference to the exemplary method of FIG. 1. If there are more than two reference points in the set of reference points, an affine transformation, of the translated set of second image coordinates is performed, step 510, or other prior art transformation method, to register the second image coordinates of the set of reference points to the first image coordinates of the set of reference points.

The various exemplary embodiment of the present invention may be carried out through the use of a general-purpose computer system programmed to perform the steps of the exemplary methods described above with reference to FIGS. 1 and 5. Exemplary general-purpose computer systems may include personal computers, work stations, distributed processing computer networks, and parallel processing computer systems. Parallel or distributed processing may be desirable for substantially real time applications involving the substantially concurrent prediction of future quotes for a plurality of financial instruments. Dedicated special-purpose computing systems may also be designed for performing exemplary methods of the present invention as well.

Additionally, it is contemplated that the methods previously described may be carried out within a general purpose computer system instructed to perform these functions by means of a computer-readable medium. Such computer-readable media include; integrated circuits, magnetic and optical storage media, as well as audio-frequency, radio frequency, and optical carrier waves.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for registering a first image to a second image using a similarity transformation, the first image including a first plurality of pixels mapped to a set of first image coordinates and the second image including a second plurality of pixels mapped to a set of second image coordinates, the method comprising the steps of:
   a) determining the first image coordinates of a plurality of reference points in the first image;
   b) determining the second image coordinates of the plurality of reference points in the second image;
   c) performing a Cartesian translation of the set of second image coordinates such that the second image coordinates of a first reference point of the plurality of reference points match the first image coordinates of the first reference point; and
   d) if the plurality of reference points includes exactly two reference points, performing a similarity transformation of the translated set of second image coordinates to scale the second image coordinates and rotate the second image coordinates about the first reference point such that the second image coordinates of a second reference point of the plurality of reference points match the first image coordinates of the second reference point; and
   e) if the plurality of reference points includes more than two reference points and no less than two reference points, performing an affine transformation of the translated set of second image coordinates to register the second image coordinates of the plurality of reference points to the first image coordinates of the plurality of reference points.

2. The method according to claim 1, wherein step (a) includes the steps of:
   a1) determining initial first image coordinates of the first reference point in the first image;
   a2) performing a Cartesian translation of the set of first image coordinates such that the first image coordinates of the first reference point are (0, 0); and
   a3) determining the first image coordinates of the second reference point in the second image using the translated set of first image coordinates.

3. The method according to claim 1, wherein step (a) includes the steps of:
   a1) identifying a feature visible in both the first image and the second image to be the first reference point;
   a2) identifying another feature visible in both the first image and the second image to be the second reference point; and
   a3) determining the first image coordinates of the first reference point and the second reference point in the first image.

4. The method according to claim 1, wherein:
the first image is a reference image including a plurality of predetermined features; and
step (a) includes the steps of:
   a1) identifying one of the plurality of predetermined features in the second image to be the first reference point;
   a2) identifying another of the plurality of predetermined features in the second image to be the second reference point; and
   a3) determining the first image coordinates of the first reference point and the second reference point in the first image.

5. The method according to claim 1, wherein:
the first image and the second image are high altitude images of a planet surface; and
the first reference point is a first ground control point (GCP) and the second reference point is a second GCP.

6. The method according to claim 5, wherein:
the high altitude images of the planet surface each include a section of coastline; and
the first GCP is a feature of the section of coastline and the second GCP is another feature of the section of coastline.

7. A method for registering a first image to a second image using a similarity transformation, the first image including a first plurality of pixels mapped to a set of first image coordinates and the second image including a second plurality of pixels mapped to a set of second image coordinates, the method comprising the steps of:
   a) determining a first plurality of reference points in the first image;
   b) determining a second plurality of reference points in the second image;
   c) identifying a set of reference points common to the first plurality of reference points and the second plurality of reference points;
   d) determining the first image coordinates and the second image coordinates of each reference point in the set of reference points identified in step (c);
   e) performing a Cartesian translation of the set of second image coordinates such that the second image coordinates of a first reference point of the set of reference points match the first image coordinates of the first reference point;
   f) if the set of reference points includes exactly two reference points, performing a similarity transformation of the translated set of second image coordinates to scale the second image coordinates and rotate the second image coordinates about the first reference point such that the second image coordinates of a second reference point of the set of reference points match the first image coordinates of the second reference point; and
   g) if the set of reference points includes more than two reference points and no less than two reference points, performing an affine transformation of the translated set of second image coordinates to register the second image coordinates of the set of reference points to the first image coordinates of the set of reference points.

8. The method according to claim 7, wherein:
a set of features in a scene are preselected;

the first image includes imagery of a first portion of the scene;

the second image includes imagery of a second portion of the scene;

step (a) includes the steps of:

a1) identifying a first subset of features of the preselected set of features of the scene that are visible in the first image; and a2) determining depictions of the first subset of features in the first image to be the first plurality of reference points; and step (b) includes the steps of:

b1) identifying a second subset of features of the preselected set of features of the scene that are visible in the second image; and b2) determining depictions of the second subset of features in the second image to be the second plurality of reference points.

9. The method according to claim 7, wherein the set of reference points common to the first plurality of reference points and the second plurality of reference points includes exactly two, three, or four elements.

10. The method according to claim 7, wherein:

the first image and the second image are high altitude images of a planet surface; and the first plurality of reference points and the second plurality of reference points are ground control points (GCPs).

11. The method according to claim 10, wherein:

the high altitude images of the planet surface each include a section of coastline; and the GCPs are depictions of features of the section of coastline.

12. A non-transitory computer readable medium adapted to instruct a general purpose computer to register a first image to a second image using a similarity transformation, the first image including a first plurality of pixels mapped to a set of first image coordinates and the second image including a second plurality of pixels mapped to a set of second image coordinates, the method comprising the steps of:

a) determining the first image coordinates of a plurality of reference points in the first image;

b) determining the second image coordinates of the plurality of reference points in the second image;

c) performing a Cartesian translation of the set of second image coordinates such that the second image coordinates of a first reference point of the plurality of reference points match the first image coordinates of a first reference point; and d) if the plurality of reference points includes exactly two reference points, performing a similarity transformation of the translated set of second image coordinates to scale the second image coordinates and rotate the second image coordinates about the first reference point such that the second image coordinates of a second reference point of the plurality of reference points match the first image coordinates of the second reference point; and e) if the plurality of reference points includes more than two reference points and no less than two reference points, performing an affine transformation of the translated set of second image coordinates to register the second image coordinates of the plurality of reference points to the first image coordinates of the plurality of reference points.

13. The non-transitory computer readable medium according to claim 12, wherein step (a) of the method includes the steps of:

a1) determining initial first image coordinates of the first reference point in the first image;

a2) performing a Cartesian translation of the set of first image coordinates such that the first image coordinates of the first reference point are (0, 0); and a3) determining the first image coordinates of the second reference point in the second image using the translated set of first image coordinates.

14. The non-transitory computer readable medium according to claim 12, wherein step (a) of the method includes the steps of:

a1) identifying a feature visible in both the first image and the second image to be the first reference point;

a2) identifying another feature visible in both the first image and the second image to be the second reference point; and a3) determining the first image coordinates of the first reference point and the second reference point in the first image.

15. The non-transitory computer readable medium according to claim 12, wherein:

the first image is a reference image including a plurality of predetermined features; and step (a) of the method includes the steps of:

a1) identifying one of the plurality of predetermined features in the second image to be the first reference point;

a2) identifying another of the plurality of predetermined features in the second image to be the second reference point; and a3) determining the first image coordinates of the first reference point and the second reference point in the first image.

16. The non-transitory computer readable medium according to claim 12, wherein:

the first image and the second image are high altitude images of a planet surface; and the first reference point is a first ground control point (GCP) and the second reference point is a second GCP.

17. The non-transitory computer readable medium according to claim 16, wherein:

the high altitude images of the planet surface each include a section of coastline; and the first GCP is a feature of the section of coastline and the second GCP is another feature of the section of coastline.

* * * * *